United States Patent [19]
Goto et al.

[11] 3,738,108
[45] June 12, 1973

[54] SAFETY DEVICE FOR AN ENGINE EQUIPPED WITH AN EXHAUST GAS PURIFIER

[75] Inventors: Kenji Goto; Norio Shibata; Kiyohiko Mizuno, all of Sunto-gun, Shizuoka Pref., Japan

[73] Assignee: Toyota Jidosha Kogyo Kabushiki Kaisha, Toyota City, Japan

[22] Filed: Feb. 9, 1971

[21] Appl. No.: 113,895

[30] Foreign Application Priority Data
Oct. 14, 1970 Japan................ 45/90204

[52] U.S. Cl. ............... 60/277, 60/285, 60/290, 123/117 A, 123/198 D
[51] Int. Cl. ............................................ F02b 75/10
[58] Field of Search ............... 60/277, 285, 286, 60/287, 288, 289, 290, 291, 292, 293; 123/117 A, 117 R, 97 B, 198 D, 41.15; 236/78; 237/8 A

[56] References Cited
UNITED STATES PATENTS

| | | |
|---|---|---|
| 2,953,898 | 9/1960 | Cornelius ................ 60/289 |
| 3,226,206 | 12/1965 | Hettich ................... 60/286 |
| 3,202,161 | 8/1965 | Richards ................ 123/41.15 |
| 3,203,168 | 8/1965 | Thomas ................... 60/286 |
| 3,360,927 | 1/1968 | Cornelius ................ 60/277 |
| 3,397,534 | 8/1968 | Knowles .................. 60/290 |
| 3,440,817 | 4/1969 | Saufferer ................ 60/288 |
| 3,481,144 | 12/1969 | Morrell .................. 60/285 |
| 3,503,716 | 3/1970 | Berger ................... 60/277 |
| 3,581,852 | 6/1971 | Griffen .................. 123/117 A |

*Primary Examiner*—Douglas Hart
*Attorney*—Toren and McGeady

[57] ABSTRACT

In an internal combustion engine equipped with an exhaust gas purifier adapted to be controlled based on the values of cooling water temperature, exhaust gas temperature and vehicle speeds detected by detectors, a safety device for the engine equipped with an exhaust gas purifier. Said safety device is characterized in that means is provided at least in a part in which temperature is elevated abnormally by abnormal operation condition of said internal combustion engine for rendering inoperative control means for said exhaust gas purifier when the elevated temperature reaches a predetermined level.

20 Claims, 3 Drawing Figures

INVENTORS
KENJI GOTO
NORIO SHIBATA
KIYOHIKO MIZUNO
BY Toren and McGeady
ATTORNEYS

SAFETY DEVICE FOR AN ENGINE EQUIPPED WITH AN EXHAUST GAS PURIFIER

This invention relates to safety devices for engines equipped with a purifier, and more particularly it is concerned with a safety device for an internal combustion engine equipped with an exhaust gas purifier which safety device is effective to prevent a reduction in the efficiency of the internal combustion engine and a damage to the after-burner which might otherwise occur when the purifier is put out of order.

Proposals have been made to employ for purifying the exhaust gas of an internal combustion engine by a device which detects vehicle speeds, cooling water temperatures and exhaust gas temperatures and transmits the results of detection to a computer. Such purifier supplies secondary air for combustion to the after-burner or delays the time of ignition when the results of calculation by the computer are in accord with the conditions set beforehand, but cuts off the supply of secondary air and restores the time of ignition to the original one when the results are not in accord with the conditions set beforehand. The purifier of this type has disadvantages in that, when any of the detectors or computer goes wrong, the temperature of gas in the after-burner may be abnormally elevated and cause a damage to the after-burner or the time of ignition may remain delayed, thereby causing an engine trouble and a deterioration of the rate of fuel consumption.

This invention has as its object the provision of a safety device which obviates the aforementioned disadvantages. The present invention provides a safety device which is characterized in that it detects a rise in the temperature of cooling water or exhaust gas when the exhaust gas purifier is put out of order and shuts off the purifier during its misoperation, thereby preventing a reduction in efficiency and overheating of the internal combustion engine.

Additional objects as well as features and advantages of the invention will become evident from the description set forth hereinafter when considered in conjunction with the accompanying drawing, in which.

Figure 1:
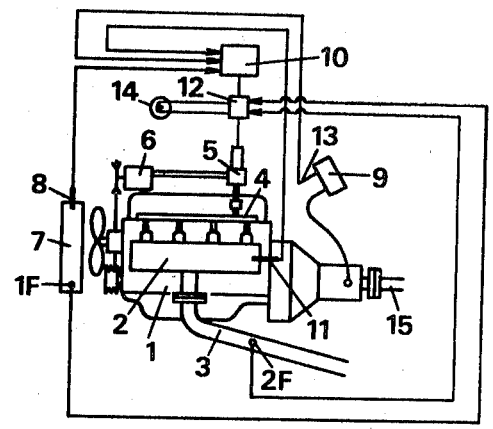
FIG. 1 is a view in explanation of the motor vehicle engine provided with the safety device comprising one embodiment of this invention, the engine being shown in model form.

In the embodiment shown in FIG. 1, an internal combustion engine 1 for a motor vehicle is equipped with an after-burner 2. Exhaust gas undergoes perfect combustion in the after-burner 2 and vented to atmosphere as purified exhaust gas.

An injection tube 4 for supplying secondary air for combustion to the after-burner 2 is connected to an air pump 6 for supplying secondary air for combustion through an electromagnetic change-over valve 5.

A cooling water temperature detector 8 provided in a radiator 7 and a speed detector 13 for a speed meter 9 of a driving shaft 15 of the internal combustion engine 1 are connected such that the results of detection are transmitted to a computer 10. An exhaust gas temperature detector 11 mounted in the after-burner 2 is also arranged such that the results of detection are transmitted to the computer 10.

Figure 2:
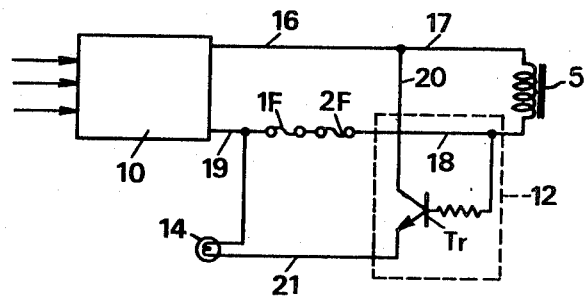
FIG. 2 is a diagram of the electric circuit for the embodiment of FIG. 1.

The radiator 7 and an exhaust pipe 3 are provided with temperature fuses 1F and 2F respectively which are inserted in an operation circuit for an electrical interrupter 12 for controlling the magnetic change-over valve 5 disposed in the path of supply of secondary air for combustion. The operation circuit is shown in FIG. 2.

A solenoid of the electromagnetic change-over valve 5, electrical interrupter 12, and temperature fuses 1F and 2F make up the safety device according to this invention. An indication lamp 14 is inserted in the operation circuit for the interrupter 12 and change-over valve 5 and lighted when the safety device is operative to indicate the presence of an abnormal state.

The operation of the safety device shown in FIGS. 1 and 2 will now be explained.

When the internal combustion engine 1 is in operation, the results of detection by cooling water temperature detector 8, exhaust gas temperature detector 11 and detector 13 for the speed meter 9 are transmitted to the computer 10. If the results of detection are not in accord with the conditions set beforehand with the computer 10, then the electromagnetic change-over valve 5 is actuated so as to supply secondary air for combustion to the after-burner 2 from the air pump 6 through the injection tube 4. In the after-burner 2, exhaust gas undergoes recombustion and its harmful components are oxidized, so that purified exhaust gas is discharged through the exhaust pipe 3.

In FIG. 2, a control current from the computer 10 is passed through lines 16 and 17, solenoid of the electromagnetic change-over valve 5, temperature fuses 1F and 2F and line 19 so as to actuate the valve 5 for controlling the supply of secondary air for combustion.

However, if the cooling water temperature detector 8, exhaust gas temperature detector 11, speed detector 13 or computer 10 misoperates and an abnormal operation state is introduced, it may become impossible to effect control of secondary air for combustion, resulting in an abnormal elevation in cooling water temperature or exhaust gas temperature. If this is the case, one of the temperature fuses 1F and 2F will be melted when its temperature reaches a predetermined level and the current from the computer 10 will be passed from the line 16 to the line 19 through a line 20, transistor $T_r$, line 21 and indication lamp 14, thereby rendering the electromagnetic change-over valve 5 inoperative. This shuts off the supply of secondary air for combustion to the after-burner 2 and prevents overheating of the internal combustion engine 1. At the same time, the indication lamp 14 is lighted and indicates the presence of an abnormal operation state.

The apparatus in the embodiment shown and described above is used when an after-burner is used in the exhaust gas purifier. It is to be understood that this invention is not limited to this embodiment, and that the safety device according to this invention may be used to control an electromagnetic negative pressure change-over valve in the exhaust gas purifying device which purifies exhaust gas by regulating the time of ignition by means of an ignition advancer of the negative pressure type instead of an after-burner.

The embodiment shown in FIGS. 1 and 2 employs the temperature fuses 1F and 2F which are melted when their temperature reaches a predetermined level. This invention is not limited to this specific form of circuit breaking means, and a bimetal or other device which is effective to turn on and off the switch circuit by undergoing a physical change when its temperature exceeds a predetermined level may be employed for automatically resetting the safety device according to this invention.

Figure 3:
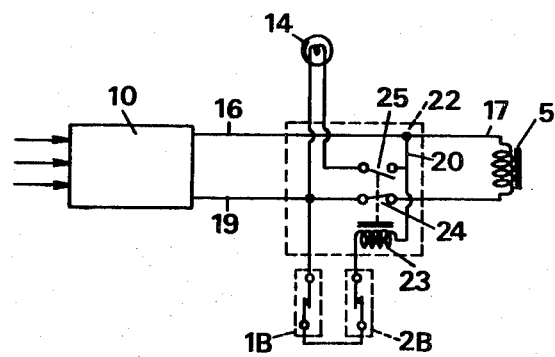
FIG. 3 is a diagram of the electric circuit for another embodiment of the invention.

FIG. 3 shows another embodiment of this invention which permits to automatically reset temperature sensing contacts. In this embodiment a thermostat 1B of the bimetal type is used in place of the temperature fuse 1F of FIG. 1 and a thermostat 2B of the bimetal type in place of the temperature fuse 2F of FIG. 1. An interrupter 22 having contacts 24 and 25 for controlling the electromagnetic change-over valve 5 is used in the embodiment of FIG. 3.

When all the parts are normally operating, the two thermostats 1B and 2B of the bimetal type are closed while the contact 24 is closed and the contact 25 is open, so that the solenoid of the electromagnetic change-over valve 5 is actuated by a control current from the computer 10. However, if one of the thermostats 1B and 2B of the bimetal type is opened when it detects an abnormally elevated temperature which exceeds a predetermined level, a relay coil 23 will be rendered inoperative, so that the contact 24 is opened and the contact 25 is closed. This opens the circuit for the solenoid of the electromagnetic change-over valve 5 and renders the solenoid of the valve 5 inoperative. At the same time, the indication lamp 14 is lighted. If the part whose elevated temperature has been detected by the thermostat 1B or 2B or the radiator 7 or exhaust pipe 3 reaches a temperature below the predetermined level, all the parts are restored to their original positions and the solenoid of the electromagnetic valve 5 is rendered operative again.

It is to be understood that the embodiment shown in FIG. 1 operates in the same manner as described herein even if its temperature fuses are replaced by thermostats of the bimetal type, and that the embodiment shown in FIG. 2 operates in the same manner as described herein even if its thermostats of the bimetal type are replaced by temperature fuses.

From the foregoing description, it will be appreciated that the safety device according to this invention is effective to detect the temperature of a part in which an abnormally elevated temperature prevails when the exhaust gas purifier misoperates as a result of failure of the cooling water temperature detector, exhaust gas temperature detector, vehicle speed detector or computer and render such part inoperative. Thus, the safety device according to this invention offers advantages in that it can prevent overheating of the internal combustion engine, a damage to a part caused by overheating or an engine trouble due to overheating.

What we claim is:

1. For an internal combustion engine having a drive shaft, cooling means for the engine, and a gas exhaust; a gas purifying system, comprising first detecting means coupled to said drive shaft for sensing the speed of the drive shaft and producing a signal indicative of the speed of the drive shaft, second detecting means coupled to said exhaust for responding to the temperature of the exhaust and for producing a signal indicative of the temperature of the exhaust, regulating means responsive to said first and second detecting means for producing control signals on the basis of the signals from said detecting means, control means responsive to the control signals of said regulating means and coupled to the engine for varying the operation of the purifying system so as to affect the nature of the exhaust gas, and safety means coupled to the engine for responding to the temperature of at least a portion of the engine and interrupting the signals between said regulating means and said control means when the temperature of the portion of the engine reaches a predetermined value.

2. A system as in claim 1 further comprising third detecting means responsive to a cooling medium in said cooling means, said regulating means being responsive to said third detecting means and producing its control signals on the basis of all three detecting means.

3. A system as in claim 1, wherein said safety means includes temperature responsive circuit breaker means located to respond to the temperature of a portion of the engine and connected between said regulating means and said control means.

4. A system as in claim 3, wherein said breaker means includes a fuse.

5. A system as in claim 3, wherein said breaker means includes thermostatic means.

6. A system as in claim 3, wherein said breaker means includes thermostatic means and a relay responsive to the condition of said thermostatic means for opening and closing the flow of signals between said regulating means and said control means.

7. A system as in claim 2, wherein said safety means includes temperature responsive breaker means located to respond to the temperature of a portion of the engine and connected between said regulating means and said control means.

8. A system as in claim 1, wherein said safety means includes indicating means for indicating whether said control means is interrupting signals between said regulating means and said control means.

9. A system as in claim 3, wherein said safety means further includes indicating means responsive to the condition of said breaker means.

10. A system as in claim 6, further comprising indicating means responsive to the condition of said relay for indicating the condition of said breaker means.

11. A system as in claim 1, wherein said control means includes after-burner means mounted on the engine and a valve for controlling the operation of said after-burner means.

12. A system as in claim 11, wherein said safety means includes indicating means for indicating whether the signals between said regulating means and said control means are interrupted.

13. A system as in claim 11, wherein said safety means includes temperature responsive circuit breaker means located to respond to the temperature of a portion of the engine and connected between said regulating means and said control means.

14. A system as in claim 11, wherein said safety means includes indicating means for indicating whether said control means is interrupting signals between said regulating means and said control means.

15. An engine comprising an engine block, a drive shaft, engine cooling means, exhaust means, first detecting means coupled to said drive shaft for producing a signal indicative of the speed of said drive shaft, second detecting means coupled to said exhaust means for producing a signal corresponding to the temperature of gases in said exhaust means, regulating means coupled to said first and second detecting means for producing control signals on the basis of the signals from said detecting means, control means responsive to the output of said regulating means for varying the exhaust means gases in said exhaust, and safety means responsive to the temperature of at least a portion of the engine and coupled between said regulating means and said control means for interrupting the coupling between said regulating means and said control means.

16. An engine as in claim 15, wherein said safety means further includes indicating means for indicating whether the coupling between said regulating means and said control means has been interrupted.

17. An engine as in claim 15, wherein said control means includes a valve and an after-burner controlled by said valve.

18. A system as in claim 3, wherein said breaker means includes a first heat responsive member mounted on the exhaust and a second heat responsive member mounted on the cooling means, said heat responsive members being connected so that opening of either discontinues signals between said regulating means and said control means.

19. A system as in claim 18, wherein said temperature responsive means are each fuses connected in series with each other.

20. A system as in claim 18, wherein said temperature responsive means are each thermostatic devices connected in series with each other for opening in response to a temperature beyond a predetermined value.

* * * * *